United States Patent
Fischer et al.

(10) Patent No.: US 10,423,571 B2
(45) Date of Patent: Sep. 24, 2019

(54) METHOD FOR CONFIGURING A REAL OR VIRTUAL ELECTRONIC CONTROL UNIT

(71) Applicant: dSPACE digital signal processing and control engineering GmbH, Paderborn (DE)

(72) Inventors: Sebastian Fischer, Paderborn (DE); Markus Suevern, Barntrup (DE); Thomas Gewering, Paderborn (DE); Barbara Kempkes, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 4 days.

(21) Appl. No.: 15/730,155

(22) Filed: Oct. 11, 2017

(65) Prior Publication Data
US 2018/0101501 A1 Apr. 12, 2018

(30) Foreign Application Priority Data
Oct. 11, 2016 (DE) .......... 10 2016 119 320

(51) Int. Cl.
| | |
|---|---|
| *G06F 15/78* | (2006.01) |
| *G06F 11/22* | (2006.01) |
| *G05B 19/02* | (2006.01) |
| *G06F 11/26* | (2006.01) |
| *G05B 19/042* | (2006.01) |

(52) U.S. Cl.
CPC ......... *G06F 15/7867* (2013.01); *G05B 19/02* (2013.01); *G05B 19/042* (2013.01); *G06F 11/2247* (2013.01); *G06F 11/261* (2013.01); *G05B 2219/23446* (2013.01); *G05B 2219/25065* (2013.01)

(58) Field of Classification Search
CPC .......... G05B 19/02; G05B 2219/25065; G05B 2219/23446; G05B 19/042; G06F 11/2247; G06F 11/261; G06F 15/7867
USPC .......................................................... 717/121
See application file for complete search history.

(56) References Cited

U.S. PATENT DOCUMENTS 9,436,673 B2 * 9/2016 Gera ..................... G06F 17/211

OTHER PUBLICATIONS

M. Wernicke, "User-friendly Configuration of AUTOSAR ECUs with Specialized Software Tools", ElektronikAutomotive, Issue 4, Apr. 2014, Vector AUTOSAR Solution.
AUTOSAR, Specification of ECU Configuration, AUTOSAR, TPS, ECUConfiguration, pp. 1-175.

* cited by examiner

*Primary Examiner* — John Q Chavis
(74) *Attorney, Agent, or Firm* — Muncy, Geissler, Olds & Lowe, P.C.

(57) ABSTRACT

A method for configuring a real or virtual electronic control unit, wherein a control unit software is executed on the control unit, and the control unit software comprises a basic software layer, the basic software layer is configured by a module configuration file by setting values of parameters, the scope of the configurable parameters being defined in a first module definition file which contains the identifiers of the configurable parameters. The first module definition file is replaced by a second module definition file, and a conversion of the first module configuration file into a second module configuration file takes place.

10 Claims, 1 Drawing Sheet

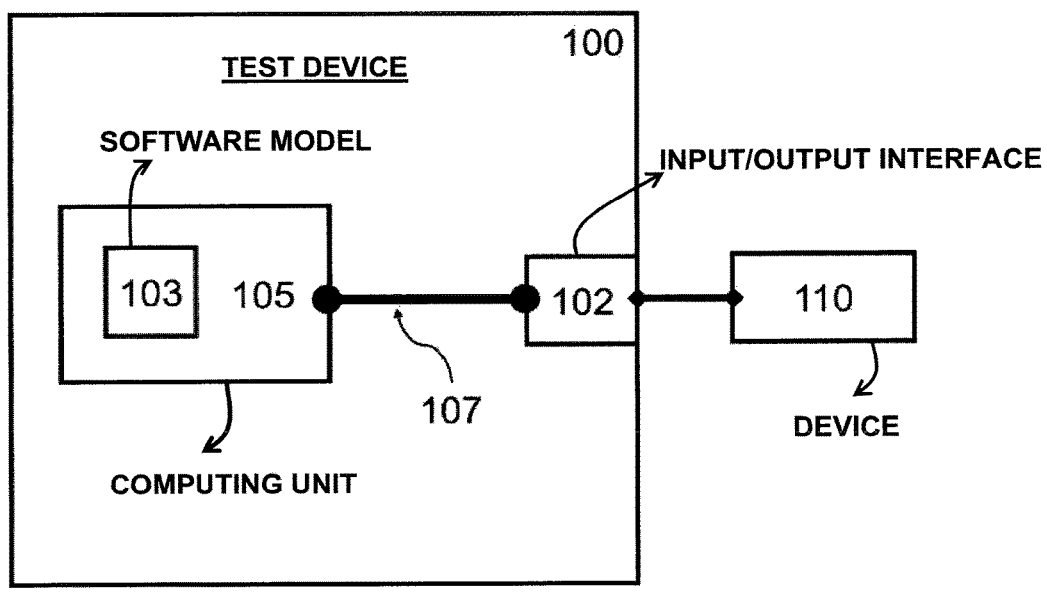

METHOD FOR CONFIGURING A REAL OR VIRTUAL ELECTRONIC CONTROL UNIT

This nonprovisional application claims priority under 35 U.S.C. § 119(a) to German Patent Application No. 10 2016 119 320.8, which was filed in Germany on Oct. 11, 2016, and which is herein incorporated by reference.

BACKGROUND OF THE INVENTION

Field of the Invention

The present invention relates to the development of control units as they are used, e.g., in the automotive industry or in the aviation industry for controlling technical systems such as, e.g., engines or brakes, as well as to test devices used in the control unit development process.

Description of the Background Art

The development of control units has become a highly complex process. New control units or new control functions should thus be tested as early in the development process as possible in order to verify general functionality and to set the direction for further development. Towards the end of the development process, it is important to test the control unit, which has already undergone extensive development, as comprehensively as possible in order to make necessary modifications based on the test results before the control unit comes into use or enters mass production and functions as desired under all conditions in later operation.

The methods of hardware-in-the-loop simulation (HIL simulation) and rapid control prototyping (RCP) are known for testing control units. In the HIL simulation, an electronic control unit is connected to a test device (HIL simulator) in which, for example, a software model of the system to be controlled or regulated by the control unit is executed. The software model is also called an environment model. The test device therefore simulates the physical environment of the later use for the control unit. In RCP, in contrast, a software model of a control unit to be developed or improved is executed on the test device. In the case of RCP, a technical system connected externally to the test device is then controlled or regulated by means of the model executed in the test device via the test device.

The testing of a (mass-produced) control unit employed in the end product is the endpoint of multiple preceding development steps of closed-loop or open-loop control to be implemented in the control unit, and these development steps are usually described with the so-called V-model or V-cycle as well. Controller development, essential for the functioning of many technical systems, starts off with the mathematical modeling of the control algorithm on a computer with a mathematical and graphical modeling environment, wherein the controller should be considered part of the control unit. In addition, the environment of the control unit is also modeled mathematically, because the interaction of the controller on the control unit with the process to be controlled is of interest. In these functional mathematical considerations, a simulation in real time is generally not necessary (offline simulation).

In the next step, the previously developed control algorithm is transferred by rapid control prototyping to a powerful, usually real-time-capable hardware unit that is connected to the actual physical process by suitable I/O interfaces, therefore, for example, to a motor vehicle engine. This real-time-capable hardware has generally nothing to do with the mass-produced control unit to be used later; at issue here is proof of the basic functionality in practice of the previously developed control.

In a further step, as part of automatic series code generation, the control is implemented on the target processor likely to actually be used later in the mass-produced control unit. Accordingly, in this step, the target hardware approximates the mass-produced control unit, but is not identical to the mass-produced control unit.

In a further step, the mass-produced control unit, which normally does not exist until a later development stage, is tested as part of a hardware-in-the-loop test (HIL). The (mass-produced) control unit, physically present in this step, is connected here by means of its physical control unit interface to a powerful simulation computer, often simply called a simulator or test device. The simulator simulates the required variables of the real control unit under test and exchanges input and output variables with the control unit. The pins of the physical control unit interface of the control unit are connected to the simulator by a cable harness. In this way, it is possible to simulate in the simulation environment all required variables, for example, of a motor vehicle engine, if applicable the entire motor vehicle with the engine, drivetrain, chassis, and road test, and to test the behavior of the control unit in interaction with the simulation environment in a risk-free manner.

The software architecture of modern electronic control units often has a layered software structure, in which a basic software (which can also be regarded as an operating system) abstracts access to the hardware of the control unit. As a result, the application-oriented or functional program parts are largely separated from the hardware-oriented program components.

The basic software is now often standardized. A frequently used standard in this case is, e.g., the AUTOSAR standard. It can be provided in these standards that one and the same basic software (but primarily also other components of the control unit software such as the runtime environment and application software) can run on control units with different hardware from different manufacturers, therefore, independent of the hardware. To achieve this, modern basic software is no longer programmed when adapting to a specific control unit, but is only configured by specifying various parameters.

The basic software usually has different modules, e.g., for special hardware drivers, storage services, communication services, hardware abstractions, system services, network services, etc. This improves reusability/interchangeability and quality.

There are different providers for the modules or the entire basic software. The configuration of the individual basic software modules takes place via so-called module configurations (in other words, module configuration files). What can be configured in a module configuration can be determined by an associated module definition.

A module definition (in other words, module definition files) can include, e.g., of the description of containers, the configuration parameters, references to other model elements, or contain additional containers. In the AUTOSAR standard, each module has a template or a definition template in which the basic configuration structure for the particular module can be specified. Such templates can be adapted to a manufacturer-specific basic software implementation. Thus, for example, additional (manufacturer-specific) containers or configuration parameters can be added, or unsupported containers or configuration parameters can be removed.

Program code generation for the serial software of the control unit is carried out from the module configurations (and possibly also further configuration data). Code generation generally only works optimally if the particular module configurations conform to the particular module definition. There are applications (e.g., in a project migration or a transition from a virtual control unit to a real one or vice versa) in which the module definitions are exchanged. In these cases it would be very laborious to reconfigure the already configured basic software. To avoid this, it is very helpful to convert the existing module configuration into a new module configuration that conforms to the new module definition.

It is often necessary to convert module configurations according to a particular module definition into another module configuration according to a different module definition. Thus far, this has not been possible in a simple, robust, fast, and easy manner.

SUMMARY OF THE INVENTION

It is therefore an object of the invention to provide a convenient and robust automatic conversion of module configurations.

In an exemplary embodiment, a method for configuring a real or virtual electronic control unit is provided, wherein a control unit software is executed on the control unit, and the control unit software comprises a basic software layer, and the basic software is configured by means of a module configuration file by setting values of parameters, the scope of the configurable parameters being defined in a first module definition file which contains the identifiers of the configurable parameters, the first module definition file is replaced by a second module definition file, and a conversion of the first module configuration file into a second module configuration file takes place, characterized by the steps: automatically comparing the first module definition file with the second module definition file and determining identifiers of automatically convertible parameters and identifiers of non-automatically convertible parameters, wherein automatically convertible parameters are those whose identifiers are contained in both the first and second module definition files, and non-automatically convertible parameters are those whose identifiers are not contained in both the first and second module definition files; automatically generating a conversion program code, wherein, upon execution of the conversion program code, the automatically convertible parameters of the module configuration file are copied into the second module configuration file; automatically generating template code in the conversion program code for the conversion of the non-automatically convertible parameters; and executing the conversion program code and generating a second module configuration file.

This method has various advantages, for example, an ECU configuration which uses the basic software of a manufacturer in a particular version n, for example, can be present as part of a project migration. Accordingly, the module configurations conform to the module definitions in version n. A newer version n+1 of the basic software employed should now be used in the control unit. The module definitions have changed between versions n and n+1. In order to be able to continue to use the configuration contents, the module configurations can be converted automatically, quickly, simply, and robustly to the definitions of the new version by the method of the invention.

An important advantage can be found in the transition from a virtual to a real ECU ("ECU"=electronic control unit=control unit). The configuration parameters developed/optimized in a virtual ECU can be reused for the real ECU. The basic software modules used in the virtual ECU may thereby differ from those in the real ECU, which requires conversion of the module configurations.

The method of the invention is also advantageous when creating a virtual ECU based on a real ECU configuration. On the basis of the configuration of a real ECU, for example, a virtual ECU can be created, wherein the basic software modules used in the virtual ECU can differ from those in the real ECU.

Likewise advantageous is the method for exchanging basic software in the development phase, wherein successive real basic software modules used, which replace the (initial) basic software modules used until then, are incorporated into the virtual ECU.

Further advantages of the method of the invention or special embodiments thereof are, for example, that data that cannot be converted according to the target definition are not lost, that the conversion logic (conversion program code) can be viewed and adapted by the user, and that a conversion can always be undone without loss of data.

The method of the invention also enables further that there can be a plurality of configurations (active and inactive), between which a switch can be made, for a control unit configuration for a module. The parameters and containers, which cannot be converted, are preserved and restored to the "old" definition during conversion.

Because changes made in an active module configuration implicitly also affect the inactive module configurations, there is also the further advantage that if parameters are changed or containers are deleted in the active module configuration, the parameters are also changed or deleted after conversion to another definition in the other module configuration as well.

The module definition file contains the identifiers or names of the configurable parameters. Furthermore, the module definition can also contain data types and multiplicities of the parameters.

Furthermore, there are advantages in that AUTOSAR data of the active module configuration are stored AUTOSAR-compliant at each point in time and they need not be converted before further steps (export to file, etc.).

The invention also avoids redundant data storage because the non-active module configurations contain only the data that cannot be accommodated in the active module configurations as defined. Furthermore, a good performance can also result, because only one module configuration is changed at any time.

With this method of the invention, elements can be converted not only when a corresponding container/parameter definition with the same name exists in the target definition. Without this method of the invention, elements (parameters) that cannot be converted using methods of the prior art would be lost, which is the case, e.g., if there are semantically identical containers/parameters in the source and target definitions, but they have different names, or if references are made by the source configuration to containers in other module configurations that are in a different hierarchy level in the target configuration.

A control unit configuration with basic software modules of different manufacturers can likewise be carried out more advantageously with this invention, wherein basic software modules of different manufacturers are to be used in a real or virtual ECU. Because there are dependencies between the different basic software modules, a plurality of module configurations are required as input for a code generator, each of which must correspond to the module definitions of the particular manufacturers (or must correspond to the module definitions that a code generator of a specific manufacturer requires); this can be achieved by a conversion according to the method of the invention.

The method of the invention also finds use in the case in which a conversion program code already exists. In this case, the steps of the automatic comparison and/or generation of the conversion program code are not executed.

The conversion program code can be stored and reused in each of the applications.

In an embodiment, the method provides that the conversion comprises the step of manually adjusting the conversion program code. This enables users to influence the automatic conversion.

In an embodiment, the control unit software satisfies the AUTOSAR specification.

The development of control units often proceeds according to a methodology in which the architecture of the functional software is defined during system design. This is done by defining software components and distributing them to the control units. Network communication is also defined in this step. The result is a system description from which a specific control unit extract is generated for each control unit. During control unit development, software components of the application layer are designed and implemented and the basic software and the runtime environment are configured. Using the configuration, the developer determines the basic software scope required for his project and the behavior of the basic software. In this way, he can optimize the entire control unit software. As a result of the configuration, he obtains a control unit configuration. Based on the control unit configuration, the basic software for the control unit software is generated or adapted by the use of code generators. The runtime environment as well is generated specific to the control unit. This methodology significantly facilitates the integration of the application software into a control unit. A manual adaptation of the basic software is therefore not necessary.

In an embodiment, the application software layer accesses the hardware of the electronic control unit via the basic software layer and/or runtime environment.

In an embodiment of the method of the invention, the first module configuration file stores which parameters have been converted. This has the advantage that no information can be lost and a back-conversion is made possible.

In an embodiment, for example, in an ECU configuration, a module can have multiple configurations between which a switch can be made. In this case, the parameters and containers that cannot be converted are preserved and restored back to the "old" definition during conversion.

In an embodiment, the converted parameters are removed from the first module configuration file. This prevents redundant data storage.

In an embodiment, a class model is generated for the conversion. This enables a simple conversion of complex data structures.

In an embodiment of the method, the control unit is connected to a HIL simulator or is executed as a virtual control unit in a HIL simulator.

As described above, physically present control unit prototypes are employed in the HIL simulation in order to test the correct functioning of the control unit and, in particular, the correct functioning of the control unit software present in the control unit. The efficiency and test quality of the HIL simulation are further improved by means of virtual validation and the additional use of virtual control units. Virtual validation describes the use of PC-based simulation for validating, verifying, and testing control unit software. For HIL simulation, it provides the capability of creating and validating test scenarios in advance on a PC-based simulation platform, as well as configuring the simulation model. In addition, initial test scenarios can be run using virtual control units. Open-loop and closed-loop tests of the control unit software and plant models can be run on the PC in this way with no connection to a real, physical system in order to detect errors and thereby to improve the quality of the control unit software even before the actual HIL simulation. Time on the HIL simulator is used more efficiently as a result of this advancement of test creation and test preparation.

Even in the early development phase, the VEOS® simulation platform allows a PC-based simulation of individual software components of control units and control unit networks. Users can continue to work in their customary work environment and reuse already existing data, models, layouts, and configurations. The same V-ECUs (virtual control units), models, layouts, and simulation scenarios that are created and used for VEOS® can be used again in the HIL simulation, thus reducing the preparation effort for HIL tests.

If a necessary part of the control unit network is not present as real control unit hardware in a HIL scenario, this part can be made available in the form of a V-ECU (virtual control unit) and used for the HIL simulation. To this end, the control unit software can be present in the form of AUTOSAR software components. The V-ECU can be integrated directly into the HIL simulation, so that a separate, labor-intensive repeat modeling of the software behavior in a behavior model is eliminated. This reuse of already existing control unit code saves the user the development and validation effort.

V-ECUs can offer the same functions and software components as the final control units. They may be present in different forms depending on the requirements for the depth of detail of the tests, e.g., they can be provided with individual control unit functions, or provided with many or all application software components, or provided with the fully integrated and configured application software, the runtime environment, the operating system, and hardware-independent basic software. Depending on the form, the scope of the communication requirement to be extracted can vary. The way in which the communication requirement is extracted can also depend on the form of the V-ECU. In the first form, the control unit function can be present, e.g., as a Simulink model or C code from which the communication requirement (data type, data width, . . . ) is then extracted. In more detailed forms, additional descriptive structures can be added to the V-ECU, such as, e.g., XML files from which additional or different communication requirements (e.g., transmission frequency, latency, accuracy, unit, . . . ) can then also be extracted.

Many aspects of control unit real-time behavior can be simulated in a relatively simple and at the same time realistic manner with V-ECUs by reusing portions of software from the control unit development. Thus, it is possible to achieve realistic results and to improve functional quality even at an early stage, before the availability of the finished control unit. The software-side configurability of HIL systems and the capability of the PC-based simulation in advance also help to reduce start-up and set-up times on the HIL simulator. The new technologies of virtual validation and the use of V-ECUs are thus finding their way into existing validation and testing processes for control unit software.

The conversion program code can contain the conversion logic that can convert the containers and parameters with the same name. The conversion program code can then be used for the conversion without further adaptation. In order to perform a name-based conversion, it is therefore not necessary that users need to grapple with the conversion logic. However, this is possible here by means of user-specific adaptations and extensions.

In addition to the actual conversion logic, further commands are generated in the conversion program code, which ensure that the containers and parameters that were actually converted are marked in the source configuration. This information can be required after execution of the conversion logic to remove the successfully converted data from the inactive source configuration. Furthermore, this information can be used to change references, pointing to converted source containers, to the new target containers.

For a module definition, a data model or interface can be generated, via which an associated module configuration can be edited without having knowledge of the actual storage format in the (AUTOSAR) data model. This means, for example, that there does not need to be a general method for creating a container in a module configuration Y for a particular definition in order to create a container but instead, an OsTask can be created in an Os. An automation interface in this case can automatically generate an access layer, adapted to the definition, for the configuration when accessing a module configuration based on the definition specified there.

Switching between module definitions can take place, for example, as follows. First, it should be ensured that a currently active module configuration references a definition and the definition exists. Further, it must be ensured that a target definition exists. If the target configuration does not yet exist in the data model, a content-free target configuration can be created. For source and target definitions, a tailored access layer can also be generated, if it does not already exist. During the execution of the conversion logic, all containers are processed in the source configuration. If a container type of the same name and of the same form exists in the same hierarchy in the target definition, new containers are created at the appropriate location in the target configuration or existing containers with the same name are reused. In this case, the name (and description, etc.) of the new container is taken over from the source container. It is marked on the source container (persistently) that it has been converted, and the container newly created for this is also saved. In the next step, all parameters of the source container are processed. If a parameter with the same name and the same form exists in the definition of the newly created target container, parameter values are copied from the source parameter to the target parameter, and the source parameter is marked as converted. Subsequently, all (not yet deleted) successfully converted containers are iterated in the source configuration. In this case, references to the newly created container are set in the reference parameters of the module configurations that reference the current, converted source container. It can now be checked whether all parameters and all child containers and their parameters are marked as converted. This is followed by deletion of the source containers of the target configuration, which are marked as converted. These are those containers that were kept in a previous conversion (in which the current target configuration was the source) only because child elements were not converted and their correspondence was deleted in the meantime, when another configuration was active. References to the source configuration are now removed in an "EcucValueCollection." The module configurations that are to be contained in the particular ECU can be referenced in the "EcucValueCollection." If the target configuration does not have the name/path specified by the user, the name or path of the target configuration is set to the indicated name/path. If there is an inactive module configuration with the same name/path, the names of this configuration are set to a different, valid name. Finally, a reference to the target configuration is added to the EcucValueCollection.

A module definition can be composed of container definitions, which in turn can contain further container definitions. Container definitions can also contain parameter definitions. This hierarchy is reflected on the part of the module configuration. The configuration elements (module configuration, container instance, parameter instance) in addition usually refer to the associated definition element.

By configuring the basic software, which is generic for many control units and applications, the basic software is adapted for a special control unit, therefore, a special hardware.

The conversion logic can be, for example, a source code of a higher programming language.

Furthermore, it is advantageous if the method of the invention comprises switching between an active module configuration file and an inactive module configuration file, or if the steps of the method of the invention are used not for configuring a real or virtual electronic control unit but for switching between an active module configuration file and an inactive module configuration file.

This refinement is based on the idea that there can be more than one module configuration per module in the data model of a control unit configuration. If two different module configuration definitions are used in a control unit configuration, accordingly, there are two module configurations, that is, one for each definition file.

In this case, only one module configuration is always "active" per module. The active module configuration is identified by being referenced, e.g., by the location where the module configurations of an ECU are referenced ("EcucValueCollection" hereafter). Only one module configuration per module is therefore referenced by the parameter EcucValueCollection, which makes it visible or active in the ECU configuration. If a module configuration is inactive, it can be ignored by all available algorithms and functions or become invisible to them. In most cases this is also achieved by the fact that an inactive module configuration is not referenced by the parameter EcucValueCollection.

Switching the active module configuration can be done by converting to another definition. This can be initiated both by a user and as a component of other, automatic, processes.

The configuration data (containers, parameters, etc.) can only be read and edited with the active module configuration. In the inactive module configurations, redundant data storage is avoided by keeping, if possible, only the data that could not be transferred to the configuration of the other definition during conversion. Thus, data can also not be lost. The information can be restored during back-conversion.

The described procedure also makes sure that each available configuration of a module can have its own storage location. Thus, it is no longer a problem if different generation tools for a module require different AUTOSAR storage locations/paths.

It should be noted that containers of a module configuration can be referenced by parameters of other module configurations. These references must not be lost during conversion and are therefore adapted to the path of the converted container.

Also advantageous is a device that is configured for configuring a real or virtual control unit according to one of the previously described methods. Such a device can be, e.g., a HIL simulator, a configuration device for a HIL system, software for generating virtual control units, or the like, or software or a device for configuring real electronic control units.

The following two paragraphs describe the source code of two exemplary module definitions that are very greatly minimized in scope. For better illustration, the presentation is simplified and corresponds semantically but not syntactically to the AUTOSAR format. In this scenario, an Os configuration of "VendorA," whose source code is described simplified below, is to be converted to the definition of "VendorB." The parameter "Schedule" in this case is semantically equal to the parameter "Preemptability." The container definition "AppMode" has a different name "ApplicationMode" for VendorB and a smaller reference parameter list.

Module definition 1: /VendorA/Os: Module {/Task: ParamConfContainer (0 . . . *] {Activation: int;};Priority int; Schedule:enum{FULL, NON}; EventRef: reference{/VendorA/Os/Event};Autostart: ParamConfContainer (0 . . . 1] {AppModeRef: reference{/VendorA/Os/AppMode}}; Event: ParamConfContainer (0 . . . *] {Mask: int;}; AppMode: ParamConfContainer (I . . . *] {EventRef: Reference{/VendorA/Os/Event}(0 . . . *]; TaskRef: reference {/VendorA/Os/Task}(0 . . . *];};};

Module definition 2: /VendorB/Os: Module {Task: ParamConfContainer(0 . . . 1 {Activation: int;};Priority: int;Preemptability: bool;EventRef: reference{/VendorB/Os/Event};Autostart: ParamConfContainer(0 . . . 1] {AppModeRef: reference{/VendorB/Os/ApplicationMode}}; Event: ParamConfContainer(0 . . . 1{Mask:int;};Appplication-Mode: ParamConfContainer(I . . . *] {*];TaskRef: reference{/VendorB/Os/Task}(0 . . . *J;};};

Source code of the OS configuration VendorA: /EcuConfig/EcucValues/Os ModuleConfig { };Task {Name=Task0; Activation=I;Priority 0;Schedule FULL;EventRef/EcuConfig/EcucValues/Os/TestEvent;};Task {Name=TaskI; Activation=2; Priority=0;Schedule=NON;Autostart {Name=TaskIAutostart;AppModeRef=/EcuConfig/EcucValues/Os/NormalAppMode;};};Event { }; Name TestEvent; Mask=0;AppMode {Name=NormalAppMode; EventRef=(/EcuConfig/EcucValues/Os/TestEvent), TaskRef=(/EcuConfig/EcucValues/Os/Task0, /EcuConfig/EcucValues/Os/TaskI);};

The following section shows an example of conversion logic as source code. The container of the "sourceTask" variable is marked here as converted using the command "self.MarkConverted(sourceTask, targetTask)" and it is stored in addition that the container of the "sourceTask" variable was converted to the container of the "targetTask" variable. It is indicated via the command "self.MarkConverted(sourceTask, "Priority")" that the parameter "Priority" has been successfully converted in the container of the "sourceTask" variable. For the non-convertible containers and parameters, the conversion logic in this example contains commented out code, which the user can use as a template.

Example of conversion logic: # Generated module conversion from /VendorA/Os to/VendorB/Osclass ModuleConversion1(ModuleConversionBase): def_new_(self):return ModuleConversionBase._new_(self,"/VendorA/Os", "/VendorB/Os")def Convert(self, source, target):# Convert Task listfor sourceTask in source.Tasks.Elements:# Get existing element or add newtargetTask=target. Tasks. GetOrAdd(sourceTask.ShortName)self. MarkConverted(sourceTask, targetTask)# Convert Activation parametertargetTask.Activation=sourceTask.Activationself.MarkConverted (sourceTask, "Activation")# Convert Priority parametertargetTask. Priority=sourceTask. Priorityself. MarkConverted (sourceTask, "Priority")# Cannot convert Schedule parameter#targetTask.=sourceTask.Schedule#self. MarkConverted(sourceTask, "Schedule")# Convert EventRef parametertargetTask. EventRef=sourceTask.EventRefself.MarkConverted(sourceTask, "EventRef")# Convert Autostart containerif sourceTask.Autostart==None:targetTask.ClearAutostart( ) else: if targetTask.Autostart==None:targetTask.AddAutostart( )self.MarkConverted(sourceTask.Autostart, targetTask.Autostart)# Convert AppModeRef parametertargetTask.Autostart.AppModeRef sourceTask.Autostart.AppModeRefself.MarkConverted(sourceTask.Autostart, "AppModeRef")# Convert Event listfor sourceEvent in source.Events.Elements:# Get existing element or add newtargetEvent target.Events.GetOrAdd(sourceEvent.ShortName)self.MarkConverted(sourceEvent, targetEvent)# Convert Mask parametertargetEvent.Mask=sourceEvent.Maskself.MarkConverted(sourceEvent, "Mask")# Cannot convert AppMode list#for sourceAppMode in source.AppModes.Elements:# Get existing element or add new#targetAppMode=target._.GetOrAdd(sourceAppMode.ShortName)#self.MarkConverted(sourceAppMode, targetAppMode)# Cannot convert EventRef parameter list#targetAppMode._.CopyFrom(sourceAppMode. EventRef)#self.MarkConverted(sourceAppMode, "EventRef")# Cannot convert TaskRef parameter list ttargetAppMode . . . CopyFrom(sourceAppMode.TaskRef)#self.MarkConverted (sourceApp Mode, "TaskRef")

In the following section, a part of the source configuration is shown by way of example as it might look after conversion. The tasks were preserved here because the "Schedule" parameter could not be converted. All other parameter values and subcontainers have been removed. The AppMode container has been preserved because a different container definition name was used in the target definition. The preserved references point to the newly created containers. Therefore, if a conversion back to the VendorA definition was carried out, they would again point to the original paths.

Example of source configuration: EcuConfig/EcucValues/ Os ModuleConfig {Task {;Name=Task0;Schedule= FULL;};Task {Name=TaskI; Schedule=NON;}; AppMode{Name=NormalAppMode; EventRef=(/AUTOSAR/Os/TestEvent);TaskRef=(/AUTOSAR/Os/Task0, /AUTOSAR/Os/Task1);};};

In the following section, a part of the target configuration is shown by way of example as it might look after the conversion. This includes all data that could be converted using the generated conversion logic. The references to successfully converted containers have been changed to the new storage location and can thus be resolved. The "AppModeRef" points to a container in the now inactive source configuration, because the referenced container could not be converted.

Example of a target configuration: /AUTOSAR/Os: ModuleConfig {Task {Name=Task0;Activation=1;Priority EventRef};0;/AUTOSAR/Os/TestEvent;Task { }; Name=Task1; Activation=2; Priority=0;Autostart {Name=Task1Autostart; AppModeRef=/EcuConfig/EcucValues/Os/ NormalAppmode;}; Event{; Name TestEvent; Mask=0;};};

The following describes how a template code could be edited:

```
# Generated module conversion from/VendorA/Os
to/VendorB/Osclass ModuleConversion1(ModuleConver-
sionBase):def new_(self):return ModuleConversion-
Base._new_(self,"/VendorA/Os","/VendorB/Os")def Con-
vert(self, source, target):# Convert Task listfor sourceTask in
source.Tasks.Elements:# Get existing element or add
newtargetTask=target. Tasks. GetOrAdd(sourceTask.Short-
Name)self.MarkConverted(sourceTask, targetTask)# Con-
vert Activation parametertargetTask.Activation=source-
Task.Activationself.MarkConverted(sourceTask, "Activa-
tion")# Convert Priority parametertargetTask.
Priority=sourceTask. Priorityself. MarkConverted(source
Task, "Priority")# Convert Schedule parametertargetTask.
Preemptability=True if sourceTask.Schedule==FULL else
Falseself.MarkConverted(sourceTask, "Schedule")# Con-
vert EventRef parametertargetTask. EventRef source
Task.EventRefself.MarkConverted(sourceTask, "Even-
tRef")# Convert Autostart containerif sourceTask.
Autostart==None: targetTask. ClearAutostart( )else: if
targetTask.Autostart==None:targetTask.AddAutostart( )
self.MarkConverted(sourceTask.Autostart, targetTask.Auto-
start)# Convert AppModeRef parametertargetTask.Autostar-
t.AppModeRef sourceTask.Autostart.AppModeRefself.
MarkConverted(sourceTask.Autostart, "AppModeRef")#
Convert Event listfor sourceEvent in source.Events.Ele-
ments:# Get existing element or add newtargetEvent tar-
get.Events.GetOrAdd(sourceEvent.ShortName)self.Mark-
Converted(sourceEvent, targetEvent)# Convert Mask
parametertargetEvent.Mask=sourceEvent.Maskself.Mark-
Converted(sourceEvent, "Mask")# Convert AppMode list-
for sourceAppMode in source.AppModes.Elements:# Get
existing element or add newtargetAppMode=target.
ApplicationModes.GetOrAdd(sourceAppMode.ShortNam
e)self.MarkConverted(sourceAppMode, targetAppMode)#
Cannot convert EventRef parameter list#targetApp-
Mode._.CopyFrom (sourceAppMode. EventRef)#self.
MarkConverted(sourceAppMode, "EventRef")# Convert
TaskRef parameter listtargetAppMode.TaskRef.CopyFrom
(sourceAppMode.TaskRef)self.MarkConverted(sourceApp-
Mode, "TaskRef")
```

It is described by way of example below how a portion of the source configuration might look after the conversion with the adapted template code: /EcuConfig/EcuValues/Os: ModuleConfig{AppMode{Name=NormalAppMode; EventRef=(/AUTOSAR/Os/testEvent);};};

It is described by way of example below how a portion of the target configuration might look after the conversion with the adapted template code: /AUTOSAR/Os: ModuleConfig{task{Name=Task0; activation=1; Priority=0; Preemtibilty=true; EventRef=/AUTOSAR/Os/TestEvent;}; Task{Name=Task1; Activation=2; Priority=0; Preemptibility=true; EventRef=/AUTOSAR/Os/Normal AppMode;};}; Event{Name=TestEvent; Mask=0;}; ApplicationMode{Name=NormalAppMode; TaskRef=(/AUTOSAR/Os/Task0, /AUTOSAR/Os/Task1);};};

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

SOLE FIGURE

The present invention will become more fully understood from the detailed description given hereinbelow and the accompanying drawing which is given by way of illustration only, and thus, is not limitive of the present invention, and wherein the sole FIGURE illustrates a test device according to an exemplary embodiment.

DETAILED DESCRIPTION

Shown in the FIGURE is a test device 100 in which a software model 103 of a technical system is executed in a computing unit 105, wherein the software model or the computing unit communicates via an input/output interface 102 of the test device and an internal data connection 107 with a device 110 connected to the test device. A computing unit can be, e.g., a processor, an FPGA, or an embedded PC. The communication with the test device can occur via the transmission of analog or digital electrical signals. The test device can comprise different hardware units (e.g., plug-in cards), which form input/output interface 102. The input/output interface and computing unit 105 form a connected system, but can also be separated spatially from one another and connected together via electronic connections.

Test device 100 can be, e.g., a "hardware-in-the-loop" (HIL) simulator. Test device 100 can also be a "rapid control prototyping" (RCP) system. The test device can also be a device, however, that is suitable for executing HIL tests or RCP tests in that a model of a technical system can be executed in the test device and this model can exchange data via input/output interfaces with a device under test, e.g., a control unit, connected to the test device, wherein particularly the response of the test device to the data, which result from the model and are transmitted to the control unit, e.g., in the form of electrical signals, is analyzed with this data exchange.

A software model 103, therefore, e.g., a model of a technical system, can be present, for example, in the form of a software model, which is specified by a source code, e.g., in a high-level language such as C, C++, or in a machine language such as, e.g., assembler or executable machine code. Any system can be modeled by a technical model in order to simulate it virtually. Thus, e.g., a model of an engine can exist as software, wherein the software is programmed such that during a simulation, here therefore an execution of the model on a CPU or FPGA, input parameters are processed by the software and output values are produced depending on the input parameters and the instance of the model. An input parameter in this case can be, e.g., voltage applied to a throttle valve of a gasoline engine and output values in this case could be a resulting throttle valve opening angle, fuel consumption, and/or torque resulting on the crankshaft. However, the model can also be a model of a control unit under test or to be developed, therefore, a virtual control unit (V-ECU). In general, the software model can be understood to be an algorithm for controlling, regulating, or simulating the behavior of a technical system.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for configuring a real or virtual electronic control unit, the method comprising:
   executing, by a processor, a control unit software on the real or virtual electronic control unit, the control unit software comprising a basic software layer, configuring, by the processor, the basic software layer via a first module configuration file by setting values of configurable parameters, a scope of the configurable parameters being defined in a first module definition file that contains identifiers of the configurable parameters;

replacing, by the processor, the first module definition file by a second module definition file;

automatically comparing, by the processor, the first module definition file with the second module definition file and determining, by the processor, identifiers of automatically convertible parameters and identifiers of non-automatically convertible parameters, wherein the automatically convertible parameters are those whose identifiers are contained in both the first and second module definition files, and the non-automatically convertible parameters are those whose identifiers are not contained in both the first and second module definition files;

automatically generating, by the processor, a conversion program code, wherein, upon execution of the conversion program code, the automatically convertible parameters of the first module configuration file are copied into a second module configuration file;

automatically generating, by the processor, template code in the conversion program code for the conversion of the non-automatically convertible parameters; and executing, by the processor, the conversion program code and generating the second module configuration file so that the first module configuration file is converted into the second module configuration file.

2. The method according to claim 1, wherein converting the first module configuration file into the second configuration comprises manually adjusting the conversion program code.

3. The method according to claim 1, wherein the control unit software satisfies the AUTOSAR specification.

4. The method according to claim 1, wherein an application software layer accesses a hardware of the real or virtual electronic control unit via the basic software layer or runtime environment.

5. The method according to claim 1, wherein the first module configuration file stores which parameters have been converted.

6. The method according to claim 1, wherein the automatically convertible parameters are removed from the first module configuration file.

7. The method according to claim 1, wherein a class model is generated for converting the first module configuration file to the second module configuration file.

8. The method according to claim 1, wherein the real or virtual control unit is connected to a HIL simulator or is executed as a virtual control unit in a HIL simulator.

9. The method according to claim 1, further comprising switching between an active module configuration file and an inactive module configuration file.

10. A device comprising:

a processor;

a real or virtual electronic control unit;

a control unit software on the real or virtual electronic control unit, the control unit software comprising:

a basic software layer;

a first module configuration file for configuring the basic software layer;

a first module definition file having automatically convertible parameters and non-automatically convertible parameters; and a conversion code configured to generate template code and convert the first module configuration file into a second module configuration file, wherein the processor is configured to:

compare identifiers of the automatically convertible parameters and the non-automatically convertible parameters of the first module definition file with identifiers of automatically convertible parameters and non-automatically convertible parameters of a second module definition file; and execute the conversion code to convert the first module configuration file into the second module configuration file having the automatically convertible parameters of the first module definition file and the template code generated by the conversion code.

* * * * *